United States Patent Office 3,186,963
Patented June 1, 1965

3,186,963
SILOXANE ELASTOMERS
John Tudor Lewis, Dinas Powis, Glamorgan, and Nigel Page, Barry, Glamorgan, Wales, assignors to Midland Silicones Limited, London, England
No Drawing. Filed Aug. 25, 1961, Ser. No. 133,781
Claims priority, application Great Britain, Sept. 5, 1960, 30,569
3 Claims. (Cl. 260—46.5)

This invention relates to improvements in the curing of organopolysiloxane elastomeric compositions.

Room temperature vulcanizing (RTV) silicone elastomers are now well known commercial products and are used in a wide variety of applications varying from encapsulating of electric components to the caulking of voids in many types of structure and equipment.

Probably the best known of these RTV elastomers are those which rely for their room temperature vulcanization and curing properties on the presence of two ingredients, namely, a metal salt of a carboxylic acid such as dibutyl tin dilaurate and an alkyl silicate or polysilicate. In order to prevent premature vulcanization of the elastomer it is convenient to supply the elastomer as a two component system, one part consisting of a simple mixture of the metal salt and an alkyl silicate and/or a polysilicate and the other component comprising the organopolysiloxane together with any other required fillers or additives. In use the two components of the system are brought together and vulcanization of the elastomeric composition takes place.

Such a system has, for the most part, proved satisfactory but it suffers from several disadvantages. For example, one of the preferred metal carboxylates is dibutyl tin dilaurate and a simple mixture of 30 parts of this salt with 70 parts by weight of ethylorthosilicate has a freezing point which is high enough to preclude its use as a liquid catalyst at low temperatures.

A more serious disadvantage of the previously known mixtures of metal-carboxylate and silicate or polysilicate is the great variation of activity shown by the catalyst system, not only when prepared from different batches of each of the catalyst components but even when mixtures are made up from samples taken from the same batches. When, as is often the case, it is necessary to prepare several batches of the catalyst mixture from a large batch of each of the two ingredients, this variation in activity of the catalyst makes it impossible to arrive at a fixed catalyst dose for curing the elastomer under a given set of conditions. Moreover, further difficulties are encountered because of the tendency of the catalyst to vary in activity during periods of storage or transit.

It is the primary object of this invention to introduce a catalyst system for use in room temperature vulcanizing silicone elastomer stocks which will exhibit a high degree of consistency in activity. A novel and improved catalyst system for silicone elastomers is a further object. Other objects and advantages of this invention are detailed in or will be apparent from the disclosure and claims following.

The present invention provides an improved catalyst system for vulcanizing organopolysiloxane rubber stocks capable of vulcanization at room temperature consisting essentially of the product obtained by heating to a temperature in the range 80° to 200° C. for at least 15 minutes a tin salt of a carboxylic acid and a silicate selected from alkyl silicates of the general formula $R_aSi(OR')_{4-a}$ where R is an alkyl radical, R' is an alkyl radical containing less than 6 carbon atoms and $a$ is 0 or 1 and partial hydrolysis products of said alkyl silicates.

The present invention further provides novel silicone rubber stocks which consist essentially of (1) a hydroxyl-containing organopolysiloxane having a viscosity of at least 100 cs. at 25° C. said organopolysiloxane having the average unit formula

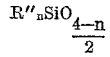

where each R" is a monovalent hydrocarbon radical or halogenated monovalent hydrocarbon radical and $n$ has an average value of from 1.90 to 2.10 inclusive, and (2) a catalyst system for vulcanizing the siloxane prepared by heating together a tin salt of a carboxylic acid and an alkyl silicate of the general formula $R_aSi(OR')_{4-a}$ where each R is an alkyl radical and each R' is an alkyl radical containing less than 6 carbon atoms and $a=0$ or 1 or a partial hydrolysis product of said alkyl silicate, at a temperature in the range 80° to 200° C. for at least 15 minutes.

The alkylsilicates employed in the preparation of the catalyst system of this invention include alkylorthosilicates of the formula $Si(OR')_4$ and alkyltrialkoxysilanes of the formula $RSi(OR')_3$ wherein R is an alkyl radical and R' is an alkyl radical of less than 6 carbon atoms. Examples of operative alkylsilicates are ethyltrimethoxysilane, methylbutoxydiethoxysilane, propyltripropoxysilane, methyltriethoxysilane, ethyltriethoxysilane, ethylorthosilicate, and n-butylorthosilicate. Also operative are alkyl polysilicates which can be prepared by the partial hydrolysis of the above defined alkylsilicates and can be represented by the formula

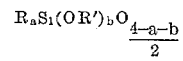

where R and R' are as above defined, $a$ has an average value from 0 through 1.0, $b$ has an average value of at least 1.0 and $a+b$ is less than 4. Examples of such polysilicates are ethyl polysilicate, isopropylpolysilicate, n-butyl polysilicate, dimethyltetraethoxydisiloxane, trimethyl pentabutoxytrisiloxane,

where Et is ethyl, Me is methyl and $x$ is 5–25, and a methyl endblocked dimethoxysiloxane or diethoxysiloxane. Mixtures of (1) monomeric alkylsilicates, (2) one or more monomeric alkylsilicates and one or more polymeric alkylpolysilicates, and (3) polymeric alkylpolysilicates can be employed.

As the second reactant for producing the improved catalysts of the present invention there are employed the carboxylic acid salts of tin, for example, dibutyl tin dilaurate, tributyl tin monolaurate, dibutyl tin diacetate, tin naphthenate, tin oleate, dibutyl tin dimaleate and stannous octoate.

The vulcanizable organopolysiloxanes employed in the present invention are polymeric materials of the average unit formula

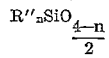

where each R" is a monovalent radical selected from hydrocarbon and halogenohydrocarbon radicals and $n$ has an average value of 1.9 to 2.1, and containing silicon bonded —OH radicals. These polymers contain predominantly (i.e., at least 90 mol percent) diorganosiloxane units ($R''_2SiO$) but can contain up to 10 mol percent of monoorganosiloxane units and/or triorganosiloxane units. The substituent organic groups represented by R" can be any monovalent hydrocarbon radical or halogenated monovalent hydrocarbon radical. For example, the R" groups can be alkyl groups such as methyl, ethyl and octadecyl; cycloaliphatic groups such as cyclohexyl and cyclopentyl; alkenyl groups such as vinyl and allyl; aromatic hydrocarbon radicals such as phenyl, xenyl and naphthyl and halogenated monovalent hydrocarbon radicals such as chloromethyl, bromophenyl, 3,3,3-trifluoropropyl, trifluorovinyl and hexafluoroxylyl. The vulcanizable siloxane polymers are fully disclosed and described in U.S. Patents No. 2,843,555 and No. 2,983,694 as well as in Australian Patent No. 216,878.

Preparation of the improved catalysts of the present invention is accomplished by heating together the organosilicon compound and the tin carboxylate. It is most convenient to heat the two components of the catalyst mixture together for a period of about 15 minutes to 5 hours and at a temperature of 80° to 200° C. The preferred time and temperature are 30 minutes at 150° C.

Another feature of this invention is the increased effectiveness as vulcanizing agents of the novel catalyst compositions of the present invention. As a result of this increased activity it is now possible to dilute the prepared catalyst composition with the organosilicon compound and hence obtain a catalyst of equal activity to, but containing a smaller proportion of, the tin salt than a simple mixture of the two ingredients.

When mixed with organopolysiloxanes of the type hereinbefore described the improved catalyst compositions of this invention provide room temperature vulcanizing siloxane rubbers with physical properties at least as good as those previously known in the art. It is to be understood that, in addition to the organopolysiloxane and the novel catalysts, the elastomeric compositions of the present invention can also contain additives such as fillers, pigments, oxidation inhibitors and organic peroxides.

Curing of the elastomeric compositions of this invention takes place spontaneously upon mixing the organopolysiloxane and the catalyst. Adjustment of the curing rate can be brought about, within limits, by varying the quantity of catalyst employed.

The following examples, in which the parts are by weight, illustrate the invention.

EXAMPLE 1

Several mixtures of the two catalyst components were made up employing varying proportions of the tin salt and the alkylsilicate. A part of each mixture was set aside and the remainder heated for about one hour.

The change in activity of the catalyst was measured by observing the time taken to gel a hydroxyl end-blocked liquid dimethylpolysiloxane having an initial viscosity of 5,600 cs. at 25° C., firstly by employing the simple mixture and then employing the mixture which had been heated.

During this series of experiments the freezing point, or alternatively the temperature at which solid separated was also measured.

The results obtained are shown in the table in which the catalyst compositions are given as percentage by weight, and EPS, DBTDL and EOS represent, ethyl polysilicate, dibutyl tin dilaurate and ethyl orthosilicate respectively.

EXAMPLE 2

A portion of the refluxed catalyst mixture containing 50% by weight each of ethyl polysilicate and dibutyl tin dilaurate was taken and mixed with an equal volume of tetraethyl orthosilicate. This catalyst was added to a hydroxyl end-blocked dimethylpolysiloxane liquid in the proportions of 0.5% by weight of the polysiloxane liquid.

The time taken for the liquid to gel was 20 minutes, compared with 90 minutes when using the same proportion of the catalyst consisting of the unrefluxed mixture of dibutyl tin dilaurate and ethyl polysilicate, and 10 minutes when the refluxed catalyst mixture was used undiluted.

EXAMPLE 3

Example 2 was repeated but employing a refluxed mixture of 50% by weight of each of ethyl orthosilicate and dibutyl tin dilaurate. This mixture was diluted with an equal volume of ethyl polysilicate containing approximately 10% by weight of silicon-bonded methyl groups.

The time taken to gel the dimethyl polysiloxane liquid was 12 minutes.

That which is claimed is:

1. A process for obtaining a composition of matter which can be converted at relatively low temperatures to an elastomeric product comprising forming a mixture of ingredients consisting essentially of (1) a hydroxyl containing organosiloxane polymer having a viscosity of at least 100 cs. at 25° C. and having the average unit formula $$R''_n SiO_{\frac{4-n}{2}}$$

where each $R''$ is a monovalent radical selected from the group consisting of hydrocarbon radicals and halogenohydrocarbon radicals and $n$ has an average value of from 1.9 to 2.1 inclusive, and (2) the reaction product obtained by heating to a temperature within the range 80° to 200° C. for a period of at least 15 minutes (a) a tin salt of a carboxylic acid, and (b) a silicon-containing material selected from the group consisting of alkylsilicates of the general formula $R_a Si(OR')_{4-a}$ where each $R$ is an alkyl radical, each $R'$ is an alkyl radical of less than 6 carbon atoms and $a$ has an average value of from 0 to 1 inclusive, and partial hydrolyzates of said alkylsilicates having the unit formula $$R_a Si(OR')_b O_{\frac{4-a-b}{2}}$$

where $R$, $R'$ and $a$ are as above defined and $b$ has a value of at least 1 and less than 4 and the sum of $a+b$ is less than 4.

2. A catalyst system for room temperature vulcanizing silicone rubbers consisting of the reaction product obtained by heating at a temperature within the range of 80° C. to Table

| Catalyst composition | | | Pot temperature, ° C. | Vapour temperature, ° C. | Before reflux | | After reflux | | Catalyst loading based on weight of polysiloxane fluid, percent |
|---|---|---|---|---|---|---|---|---|---|
| EPS | DBTDL | EOS | | | Freezing point, ° C. | Gel time (activity) | Freezing point, ° C. | Gel time (activity) | |
| 90 | 10 | ------ | 168 | 95-97 | 5 | 50 mins | -18 | 26 mins | 1 |
| 80 | 20 | ------ | 160 | 91 | 13 | 40 mins | -12 | 11 mins | 1 |
| 70 | 30 | ------ | 156-163 | 95-98 | 16 | 30 mins | -8 | 6 mins | 1 |
| 60 | 40 | ------ | 150 | 88 | (*) | 98 mins | -5 | 12 mins | 0.5 |
| 50 | 50 | ------ | 132-153 | 84 | (*) | 90 mins | -4 | 10 mins | 0.5 |
| 40 | 60 | ------ | 132-168 | 81 | (*) | 2 hrs | -4 | 25 mins | 0.5 |
| 30 | 70 | ------ | 125-174 | 80 | (*) | 24 hrs | -4 | 90 mins | 0.5 |
| 20 | 80 | ------ | 115-125 | 80 | (*) | >24 hrs | -4 | >24 hrs | ------ |
| ------ | 10 | 90 | 117-126 | 90 | -31 | 2 hrs | -40 | 15 mins | 1 |
| ------ | 20 | 80 | 115-125 | 88-85 | -14 | 2½ hrs | -28 | 5 mins | 1 |
| ------ | 30 | 70 | 110-132 | 92-90 | -2 | 2½ hrs | -18 | 5 mins | 1 |
| ------ | 40 | 60 | 110-125 | 80 | 5 | ≃12 hrs | -16 | 8 mins | 0.5 |
| ------ | 50 | 50 | 110-155 | 88 | 9 | ≃12 hrs | -10 | 3 mins | 0.5 |
| ------ | 60 | 40 | 110-146 | 89-86 | 11 | ≃12 hrs | -7 | 7 mins | 0.5 |
| ------ | 70 | 30 | 105-130 | 82-84 | 13 | 3 hrs, 40 mins | -6 | 12 mins | 0.5 |
| ------ | 80 | 20 | 105-140 | 82-79 | (*) | >24 hrs | -6 | >24 hrs | ------ |

*DBTDL settled out at room temperature (22° C.)

200° C. for a period of at least 15 minutes (a) a tin salt of a carboxylic acid and (b) a silicon-containing material selected from the group consisting of alkylsilicates of the general formula $R_aSi(OR')_{4-a}$ where each R is an alkyl radical, each R' is an alkyl radical of less than 6 carbon atoms and $a$ has an average value of from 0 to 1 inclusive, and partial hydrolyzates of said alkylsilicates having the unit formula $$R_aSi(OR')_bO_{\frac{4-a-b}{2}}$$

where R, R' and $a$ are as above defined and $b$ has a value of at least 1 and less than 4 and the sum of $a+b$ is less than 4.

3. The catalyst of claim 2 further characterized in that the tin salt is dibutyl tin dilaurate.

References Cited by the Examiner
UNITED STATES PATENTS

| | | | |
|---|---|---|---|
| 2,843,555 | 7/58 | Berridge | 260—46.5 |
| 2,983,694 | 5/61 | Page et al. | 260—18 |
| 2,985,546 | 5/61 | Leavitt | 260—46.5 |
| 2,999,077 | 9/61 | Nitzsche et al. | 260—46.5 |

MURRAY TILLMAN, *Primary Examiner.*

MILTON STERMAN, WILLIAM H. SHORT,
*Examiners.*